US006610217B2

(12) United States Patent
Marking et al.

(10) Patent No.: US 6,610,217 B2
(45) Date of Patent: Aug. 26, 2003

(54) ZNS:AG,Al PHOSPHOR AND METHOD OF MAKING SAME

(75) Inventors: Gregory A. Marking, Sayre, PA (US); Courtney S. Warren, Waverly, NY (US); Brian J. Payne, Sayre, PA (US)

(73) Assignee: Osram Sylvania Inc., Danvers, MA (US)

( * ) Notice: Subject to any disclaimer, the term of this patent is extended or adjusted under 35 U.S.C. 154(b) by 87 days.

(21) Appl. No.: 09/911,114

(22) Filed: Jul. 23, 2001

(65) Prior Publication Data

US 2002/0195588 A1 Dec. 26, 2002

Related U.S. Application Data

(60) Provisional application No. 60/222,183, filed on Aug. 1, 2000.

(51) Int. Cl.[7] .......................... C09K 11/56; C09K 11/54
(52) U.S. Cl. ................................................. 252/301.6 S
(58) Field of Search .................................... 252/301.6 S

(56) References Cited

U.S. PATENT DOCUMENTS

| 2,421,207 A | 5/1947 | Leverenz ................. 252/301.6 |
| 3,666,677 A | 5/1972 | Fisher Jr. et al. |
| 6,117,363 A | 9/2000 | Ihara et al. ............ 252/301.65 |

FOREIGN PATENT DOCUMENTS

JP          63-227690        *  9/1988

OTHER PUBLICATIONS

L. Ozawa, *Cathodoluminescence, Theory and Applications*, pp. 134, 246–252 (Kodansha Ltd., Tokyo 1990).

* cited by examiner

*Primary Examiner*—C. Melissa Koslow
(74) *Attorney, Agent, or Firm*—Robert F. Clark

(57) ABSTRACT

A ZnS:Ag,Al phosphor and method of making are described wherein the ZnS:Ag,Al phosphor exhibits a substantially polyhedral morphology and low particle agglomeration. The method of making includes the use of a mixed sodium chloride and alkaline-earth metal chloride flux. The resulting ZnS:Ag,Al phosphors may be made into finished CRT phosphors having improved CRT screen making properties.

31 Claims, 2 Drawing Sheets

ZNS:AG,A1 PHOSPHOR AND METHOD OF MAKING SAME

CROSS REFERENCES TO RELATED APPLICATIONS

This application claims the benefit of U.S Provisional Application No. 60/222,183, filed Aug. 1, 2000.

TECHNICAL FIELD

This invention relates to silver-activated zinc sulfide (ZnS:Ag) phosphors. More particularly, it relates to the synthesis and processing of unpigmented base ZnS:Ag phosphors used to provide the blue luminescent component of phosphor screens in cathode ray tubes.

BACKGROUND ART OF THE INVENTION

Blue-emitting ZnS:Ag phosphors are used in the manufacture of cathode ray tubes (CRT) which are widely used in color televisions and computer display monitors. Silver-activated zinc sulfide phosphors are easily handled, chemically stable, and have good emission efficiency. ZnS:Ag CRT phosphors have been prepared in a variety of methods. In one conventional method, zinc sulfide is mixed with a sodium chloride flux and a silver-containing material such as silver chloride. The mixture is then baked in a reducing atmosphere containing a sulfiding species such as carbon disulfide or hydrogen sulfide. After baking, the ZnS:Ag phosphor is allowed to cool and the flux is removed through water washing. Additional finishing steps, e.g., milling, pigmenting, and coating with an organic binder, are employed before the phosphor is used to manufacture cathode ray tubes. The phosphor as it exists before these additional finishing steps is referred to as a "base" phosphor. The phosphor after the additional steps is referred to as a "finished" phosphor. Unless otherwise indicated, the phosphors described herein are base phosphors.

The physical properties of base phosphor particles—size, distribution, and morphology—strongly affect the way the finished phosphor behaves in the processing of CRT screens. The particle size distribution of the phosphor needs to be relatively narrow and the particle morphology should be polyhedral in order to obtain high quality screens. Particles which are too large tend to fall off the screen causing pinholes. Particles which are too small stick to areas where their are not desired leading to color cross-contamination. The desired size of the phosphor particles varies according to the type of cathode ray tube being manufactured. Typically, the desired particle size for television picture tubes is about 9 micrometers ($\mu$m).

The conventional method of making ZnS:Aq phosphors is inadequate in that it produces phosphors with less than the desired particle characteristics. In particular, the use of the sodium chloride flux does not promote the formation of polyhedral particles, the particle size distribution tends to be very wide with a large amount of fine particles, and the particles tend to be strongly agglomerated.

SUMMARY OF THE INVENTION

It is an object of the invention to obviate the disadvantages of the prior art.

It is another object of the invention to provide a ZnS:Ag, Al phosphor having low particle agglomeration and a substantially polyhedral morphology.

It is another object of the invention to provide a method of making a ZnS:Ag,Al phosphor having low particle agglomeration and a substantially polyhedral morphology.

In accordance with one object of the invention, there is provided a blue-emitting ZnS:Ag,Al phosphor powder comprising ZnS:Ag,Al phosphor particles having a substantially polyhedral morphology and a % $\Delta_{D50}$ of less than about 20%.

In accordance with another object of the invention, there is provided a method of making a ZnS:Ag,Al phosphor which comprises combining an amount of a zinc sulfide source, an amount of a silver source, an amount of an aluminum source, an amount of a mixed flux, and optionally, an amount of an ammonium chloride source, the mixed flux comprising a mixture of sodium chloride and an alkaline-earth metal chloride selected from barium chloride, calcium chloride, magnesium chloride, strontium chloride, and their hydrated salts. The combined sources and mixed flux are fired in a sulfur-containing atmosphere for a time and a temperature sufficient to form the ZnS:Ag,Al phosphor and then the phosphor is washed to remove residual flux and unreacted silver.

In one aspect of the method of this invention, the alkaline-earth metal chloride is added in an amount from 1% to 10% by weight of the zinc sulfide source and the sodium chloride is added in an amount from 1% to 30% by weight of the zinc sulfide source. In a narrower aspect, the alkaline-earth metal chloride is added in an amount from 2% to 6% by weight of the zinc sulfide source and the sodium chloride is added in an amount from 15% to 25% by weight of the zinc sulfide source.

In another aspect of the method of this invention, the zinc sulfide source is a chlorinated zinc sulfide and the amount of ammonium chloride is from 0 to 2% by weight of the chlorinated zinc sulfide. In a narrower aspect, the alkaline-earth metal chloride is added in an amount from 1% to 10% by weight of the chlorinated zinc sulfide and the sodium chloride is added in an amount from 1% to 30% by weight of the chlorinated zinc sulfide. In a still narrower aspect, the alkaline-earth metal chloride is added in an amount from 2% to 6% by weight of the chlorinated zinc sulfide source and the sodium chloride is added in an amount from 15% to 25% by weight of the chlorinated zinc sulfide source.

DESCRIPTION OF PREFERRED EMBODIMENTS

Figure 1A:
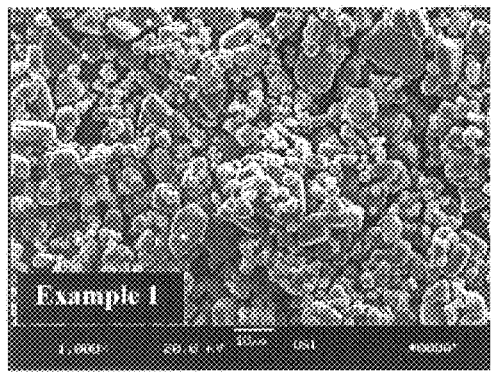
FIGS. 1A and 1B are Scanning Electron Microscope (SEM) photomicrographs comparing the morphology of a conventional ZnS:Ag with a ZnS:Ag,Al phosphor.

For a better understanding of the present invention, together with other and further objects, advantages and capabilities thereof, reference is made to the following disclosure and appended claims taken in conjunction with the above-described drawings.

The present invention is a superior silver-activated zinc sulfide phosphor a substantially polyhedral morphology and low particle agglomeration. In a preferred embodiment, the phosphor has the additional advantages of a narrow particle size distribution with a reduced number of fine particles, a desirable mean particle size for CRT applications, and an efficient blue emission. The phosphors of this invention may be made into finished CRT phosphors having improved CRT screen making properties.

The method of the present invention uses a mixed flux of NaCl and an alkaline-earth metal chloride selected from barium chloride ($BaCl_2$), calcium chloride ($CaCl_2$), strontium chloride ($SrCl_2$) or magnesium chloride ($MgCl_2$) or their hydrated salts (e.g., $CaCl_2$-$2H_2O$). Preferably, the mixed flux is NaCl-$BaCl_2$ or NaCl-$CaCl_2$. More preferably, the mixed flux is NaCl-$CaCl_2$. The mixed flux is used in combination with the addition of aluminum to the phosphor formulation to provide the superior properties. The incorporation of aluminum yields a silver-activated ZnS phosphor having the general formula, ZnS:Ag,Al. Preferably, the silver concentration in the base ZnS:Ag,Al phosphor is from about 100 ppm to about 300 ppm and the aluminum concentration is from about 50 ppm to about 200 ppm. More preferably, the concentration of silver is from about 180 ppm to about 220 ppm and the concentration of aluminum is from about 100 ppm to about 180 ppm.

In a preferred embodiment, the method of this invention includes combining an amount of a sodium chloride and alkaline-earth metal chloride flux, an amount of a zinc sulfide and silver nitrate mixture containing 1 weight percent silver (1% Ag), an amount of a zinc sulfide and aluminum chloride mixture containing 1 weight percent aluminum (1% Al mix), an amount of ammonium chloride, and an amount of a chlorinated zinc sulfide, ZnS(Cl). The chlorinated zinc sulfide contains from about 0.7% to about 1.3% chlorine by weight and preferably about 1% chlorine by weight. It is preferred that the sodium chloride flux is added in an amount from 1% to 30% by weight of the ZnS(Cl), the alkaline-earth metal chloride flux is added in amount from 1% to 10% by weight of the ZnS(Cl), the 1% Ag mixture is added in an amount from 1% to 5% by weight of the ZnS(Cl), the 1% Al mixture is added in an amount from 0.5% to 4% by weight of the ZnS(Cl), and the ammonium chloride is added in an amount from 0 to 2% by weight of the ZnS(Cl). More preferably, the amount of sodium chloride is from 15% to 25% by weight of the ZnS(Cl), the amount of the alkaline-earth metal chloride is from 2% to 6% by weight of the ZnS(Cl), the amount of the 1% Ag mixture is from 2% to 4% by weight of the ZnS(Cl), and the amount of the 1% Al mixture is from 1 to 3% by weight of the ZnS(Cl). When barium chloride is used in the mixed flux, a more preferred blend contains sodium chloride at 21% by weight of the ZnS(Cl), barium chloride at 4% by weight of the ZnS(Cl), 1% Ag mix at 3.9% by weight of the ZnS(Cl), 1% Al mix at 2% by weight of the ZnS(Cl), and ammonium chloride at 1% by weight of the ZnS(Cl).

The starting materials are thoroughly blended and then baked in boats under a sulfide-containing atmosphere, e.g., carbon disulfide/nitrogen, at a temperature from about 1675° F. to about 1720° F. for about 1 hour to about 2.5 hours. The boats are allowed to cool to room temperature and then the fired material is washed with sodium thiosulfate and water until the conductivity is less 50 uS/cm. The thiosulfate ions complex any silver ions that are not incorporated into the ZnS lattice. Typically, 80 grams of sodium thiosulfate is used per gallon of water per kilogram of fired phosphor cake. However, when barium chloride is present in the mixed flux, a brown or gray body color results causing reduced light output from the phosphor. It is believed that the body color is due to a barium thiosulfate precipitate which captures some of the unreacted silver ions. The body color may be reduced or eliminated by using a more dilute thiosulfate solution (2–10 times the amount of water), a thiourea wash (200–400 g thiourea/1–2 gal. of water/kg of phosphor), or a thiourea/hydrogen peroxide wash. The thiourea complexes the unreacted silver ions but does not form a barium-thiourea precipitate. After the barium chloride flux has been removed with the thiourea wash, a thiosulfate wash may be used to further remove unreacted silver. At this point, the base blue-emitting ZnS:Ag,Al phosphor is complete and exhibits an improved morphology, a low level of agglomeration, a narrow particle size distribution, a reduced number of fines, and desirable optical properties. Preferably, the mean particle size of the base ZnS:Ag,Al phosphor ranges from about 7 $\mu$m to about 11 $\mu$m and more preferably from about 8.5 $\mu$m to about 9.5 $\mu$m.

The following non-limiting examples are presented. Unless otherwise indicated, the percentages of the blend components used in the examples are given as a percentage by weight (wt. %) of the ZnS(Cl) component.

EXAMPLES 1–5

Table 1 provides the amounts of the starting materials combined to make Examples 1–5 and the corresponding controls.

EXAMPLE 1

The starting materials for Example 1 and Control 1 were thoroughly blended in one gallon plastic bottles using a roll-mill and paint shaker and then loaded into silica boats. The blended materials were baked for 1.67 hours in a quartz muffle furnace at 1685° F. under a flowing atmosphere of nitrogen and carbon disulfide.

EXAMPLE 2

The starting materials for Example 2 and Control 2 were thoroughly blended in 16 ounce plastic bottles using a roll-mill and paint shaker. The blended materials were loaded into small covered silica crucibles which were then placed in larger silica boats and baked for 1.67 hours in a quartz muffle furnace at 1675° F. under a flowing atmosphere of nitrogen gas.

EXAMPLE 3

Example 3 and Control 3 were blended in similar fashion as Example 1 and then split into three equal parts which were baked for three different periods of time (1.17, 1.67, and 2.50 hours) in a quartz muffle furnace at 1675° F. under a flowing atmosphere of nitrogen and carbon disulfide.

EXAMPLE 4

Example 4 and Control 4 were also blended in the same fashion as Example 1 and then baked for 1.67 hours in a quartz muffle furnace at 1675° F. under a flowing atmosphere of nitrogen and carbon disulfide.

EXAMPLE 5

Example 5 and Control 5 were thoroughly blended in a double cone blender, loaded into silica boats, and baked in a quartz muffle furnace at 1675° F. under a flowing atmosphere of nitrogen and carbon disulfide. Example 5 was baked for 2.00 hours and Control was baked for 2.50 hours under the above conditions.

In each example, the boats or crucibles were slowly cooled to room temperature after firing. The fired materials were then washed with hot de-ionized water and sodium thiosulfate until the conductivity of the wash water was less than 50 uS/cm. The material was dewatered, dried at 130° C., and sieved −325 mesh.

TABLE 1

Compositions of ZnS:Ag CRT Phosphors

| Example No. | ZnS (g) | 1% Ag (g) | 1% Al (g) | NH$_4$Cl (g) | NaCl (g) | BaCl$_2$ (g) |
|---|---|---|---|---|---|---|
| Example 1 | 2000 | 48 | 40 | 20 | 80 | 0 |
| Control 1 | 2000 | 48 | 0 | 20 | 80 | 0 |
| Example 2 | 240 | 5.76 | 4.8 | 2.4 | 53.2 | 9.4 |
| Control 2 | 240 | 5.76 | 0 | 2.4 | 9.6 | 0 |
| Example 3 | 5000 | 150 | 100 | 50 | 1050 | 200 |
| Control 3 | 2500 | 60 | 0 | 25 | 100 | 0 |
| Example 4A | 1500 | 45 | 30 | 15 | 315 | 60 |
| Example 4B | 1500 | 48 | 30 | 15 | 315 | 60 |
| Example 4C | 1500 | 51 | 30 | 15 | 315 | 60 |
| Example 4D | 1500 | 54 | 30 | 15 | 315 | 60 |
| Example 4E | 1500 | 57 | 30 | 15 | 315 | 60 |
| Example 4F | 1500 | 60 | 30 | 15 | 315 | 60 |
| Example 4G | 1500 | 48 | 30 | 15 | 315 | 60 |
| Control 4 | 1500 | 36 | 0 | 15 | 60 | 0 |

| | ZnS (kg) | 1% (kg) | Ag 1% (kg) | Al NH$_4$Cl (kg) | NaCl (kg) | BaCl$_2$ (kg) |
|---|---|---|---|---|---|---|
| Example 5 | 300 | 11.7 | 6.0 | 3.0 | 63.0 | 12.0 |
| Control 5 | 1400 | 33.6 | 0 | 14.0 | 56.0 | 0 |

The base ZnS:Ag, Al phosphors prepared in the above examples were examined for their particle size distribution, emission color, and particle morphology. Photomicrographs taken with a scanning electron microscope (SEM) were used to evaluate particle morphology. For particle size measurements, a small amount of sample was added to an electrolyte solution (20 g NaCl+0.14 g 2-hydroxybiphenyl sodium salt tetrahydrate in 2 liters of water) and dispersed. Two or three drops of a 1% tergitol surfactant solution may be added aid wetting. The particle size distributions were measured with a Coulter Counter Multisizer IIe. Particle size measurements were made on samples before (nonsonic) and after (sonic) deagglomeration. The nonsonic measurement was made after dispersing the sample in 20 ml of the electrolyte solution for 30 seconds in an ultrasonic bath. The sonic measurement was made after the sample was deagglomerated by inserting an ultrasonic probe (Sonifier Cell Disruptor 350 manufactured by Branson Sonic Power) for one minute into a 200 ml beaker containing a dispersion of the sample in 100 ml of the electrolyte solution. The ultrasonic probe operated at 20 kHz and 100W (continuous mode) exerts enough energy to break most of the particulate agglomerates apart. The percentage difference (% $\Delta_{D50}$) between the 50% size of the nonsonic Coulter Counter measurement (D50$_{ns}$) and 50% size of the sonic Coulter Counter measurement (D50$_s$) is an indicator of the amount of agglomeration present in the base phosphor.

$$\% \Delta_{D50} = 100\% * (D50_{ns} - D50_s)/D50_{ns}$$

A large percentage change in the 50% size after sonication indicates a significant amount of agglomeration in the base phosphor. It is preferred that % $\Delta_{D50}$ be less than about 20% and more preferably less than about 10%.

The relative brightness of the phosphors was corrected for color and then proportioned against the appropriate control sample. The brightness of each control was taken to be 100%. The color correction was made by subtracting 1.45% brightness for each block (0.001 units) that the Y color coordinate (Y) was above the Y color coordinate of a standard ZnS:Ag CRT phosphor (Y=0.0554) and adding 1.45% brightness for each block that the Y color coordinate was below that value. This method of color correction was determined empirically and is deemed accurate when the Y color coordinate is within approximately 20 blocks of the reference standard. The Y coordinate of the base ZnS:Ag,Al phosphor is preferably from about 0.048 to about 0.056.

Figure 1B:
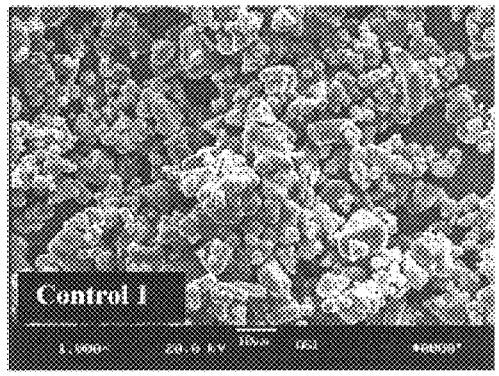

Analytical results for Example 1 are reported in Table 2 and 1 demonstrate the beneficial effect of adding aluminum to the phosphor formulation. Example 1 differs from the control only by the addition of 2 wt. % of the 1% Al mix. The results show that the amount of agglomeration is significantly reduced and the relative brightness is improved through addition of aluminum into the formulation. The SEM photomicrographs (1000×) in FIGS. 1A and 1B show that the particle size distributions of Example 1 and Control 1 are similar with some large particles and many small, fine particles. However, the particles in Example 1 are discreet, with very little agglomeration, while the particles in Control 1 are strongly agglomerated. The reduction in agglomerates is confirmed by the low % $\Delta_{D50}$ value for Example 1.

TABLE 2

| | 1% Al mix | D50$_{ns}$ ($\mu$m) | D50$_s$ ($\mu$m) | %$\Delta_{D50}$ | Relative brightness | X | Y |
|---|---|---|---|---|---|---|---|
| Example 1 | 2.0% | 8.33 | 7.58 | 9% | 109% | 0.147 | 0.056 |
| Control 1 | 0.0% | 13.38 | 7.86 | 41% | 100% | 0.147 | 0.054 |

Figure 2A:
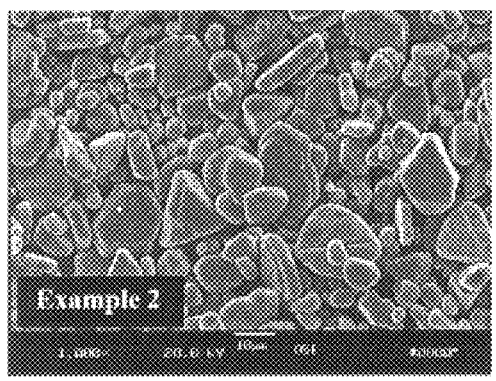
FIGS. 2A and 2B are SEM photomicrographs comparing the morphology of a conventional ZnS:Ag phosphor with a ZnS:Ag,Al phosphor made with a mixed NaCl-BaCl$_2$ flux.
Figure 2B:
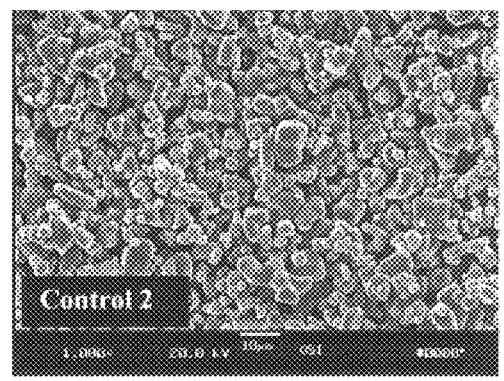

Analytical results for Example 2 are reported in Table 3 and demonstrate the beneficial effect of using a mixed NaCl-BaCl$_2$ flux. Example 2 differs from Control 2 by the use of a mixed NaCl-BaCl$_2$ flux and the addition of 2 wt. % of the 1% Al mix. As in Example 1, the % $\Delta_{D50}$ value indicates that particle agglomeration is significantly reduced relative to the control. Furthermore, the SEM photomicrographs (1000×) in FIGS. 2A and 2B show that the number of small particles in Example 2 is significantly reduced as compared to Control 2 and that the phosphor particles in Example 2 are substantially polyhedral.

TABLE 3

| | 1% Al mix | NaCl Flux | BaCl$_2$ Flux | D5O$_{ns}$ ($\mu$m) | D50$_s$ ($\mu$m) | %$\Delta_{D50}$ | Relative brightness | Y |
|---|---|---|---|---|---|---|---|---|
| Example 2 | 2% | 21% | 4% | 11.1 | 9.96 | 10% | 96% | 0.068 |
| Control 2 | 0% | 4% | 0% | 13.6 | 8.52 | 38% | 100% | 0.071 |

Analytical results for Example 3 are reported in Table 4 below. These results demonstrate the effect of baking time upon the particle size and optical properties of a ZnS:Ag,Al phosphor prepared using a mixed NaCl-BaCl$_2$ flux, 2% of the Al mix, and an increased amount of the 1% Ag mix, 3.0% vs. 2.4% in the control. These results show that the mean particle size increases as the baking time is increased. Also, the Y coordinate increases as the baking time is increased, presumably due to an increased loss of silver through vaporization. Accordingly, the baking time for the phosphor must be adjusted empirically to reach the desired particle size. After the baking time is determined, the amount of silver must be adjusted to yield the desired color for that particular baking time.

TABLE 4

|  | 1% Ag mix | 1% Al mix | NaCl Flux | BaCl$_2$ Flux | Firing time (min) | D50$_{ns}$ ($\mu$m) | %Δ$_{D50}$ | Relative brightness | Y |
|---|---|---|---|---|---|---|---|---|---|
| Example 3A | 3.0% | 2% | 21% | 4% | 70 | 7.37 | 14% | 98% | 0.054 |
| Example 3B | 3.0% | 2% | 21% | 4% | 100 | 9.39 | 11% | 102% | 0.058 |
| Example 3C | 3.0% | 2% | 21% | 4% | 150 | 12.0 | 7% | 99% | 0.061 |
| Control 3 | 2.4% | 0% | 4% | 0% | 100 | 15.1 | 36% | 100% | 0.058 |

Analytical results for Example 4 are reported in Table 5 below. These results demonstrate the effect of the silver addition upon the optical properties of a ZnS:Ag,Al phosphor prepared using a mixed NaCl-BaCl$_2$ flux and 2 wt. % of the 1% Al mix. These results show that the Y color coordinate generally decreases as the amount of Ag is increased.

TABLE 5

|  | 1% Ag mix | 1% Al mix | NaCl Flux | BaCl$_2$ Flux | Relative Brightness | Y |
|---|---|---|---|---|---|---|
| Example 4A | 3.0% | 2% | 21% | 4% | 107% | 0.063 |
| Example 4B | 3.2% | 2% | 21% | 4% | 101% | 0.057 |

TABLE 5-continued

|  | 1% Ag mix | 1% Al mix | NaCl Flux | BaCl$_2$ Flux | Relative Brightness | Y |
|---|---|---|---|---|---|---|
| Example 4C | 3.4% | 2% | 21% | 4% | 105% | 0.059 |
| Example 4D | 3.6% | 2% | 21% | 4% | 107% | 0.054 |
| Example 4E | 3.8% | 2% | 21% | 4% | 103% | 0.057 |
| Example 4F | 4.0% | 2% | 21% | 4% | 106% | 0.055 |
| Example 4G | 3.2% | 2% | 21% | 4% | 106% | 0.060 |
| Control 4 | 2.4% | 0% | 4% | 0% | 100% | 0.056 |

Figure 3A:
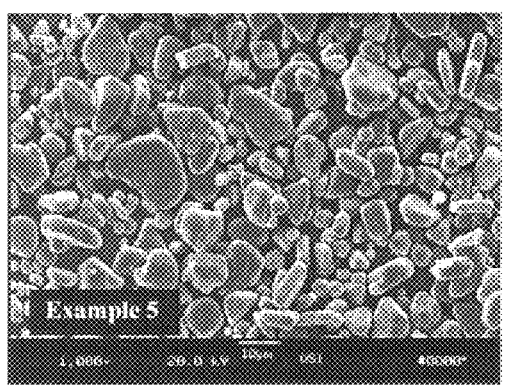
FIGS. 3A and 3B are SEM photomicrographs comparing the morphology of a conventional ZnS:Ag phosphor with a ZnS:Ag,Al phosphor made with a mixed NaCl-BaCl$_2$ flux; both phosphors being made on a production scale.
Figure 3B:
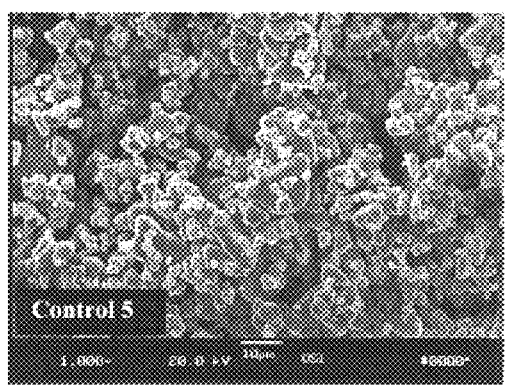

Analytical results for the Example 5 are reported in Table 6 and the corresponding SEM photomicrographs (1000×) are shown in FIGS. 3A and 3B. These phosphor lots were made on a production scale and the analytical data and SEM photomicrographs obtained from them demonstrate the significant improvements in particle size, particle morphology, particle size distribution, and agglomeration found by using the inventive formulation and method described herein. The optical properties of the two phosphor lots are comparable, the inventive formulation and method described herein. The optical properties of the two phosphor lots are comparable, with Example 5 being slightly brighter than Control 5.

TABLE 6

|  | D50$_{ns}$ ($\mu$m) | D50$_s$ ($\mu$m) | %Δ$_{D50}$ | Relative brightness | Y |
|---|---|---|---|---|---|
| Example 5 | 9.42 | 9.36 | 0.6% | 102% | 0.054 |
| Control 5 | 12.53 | 8.62 | 31% | 100% | 0.054 |

EXAMPLES 6–15

Table 7 provides the amounts of the starting materials combined to make Examples 6–15. Example 6 is a comparative ZnS:Ag phosphor made without Al or the mixed flux.

TABLE 7

| Example | ZnS(Cl) (g) | 1% Ag mix (g) | 1% Al mix (g) | NH$_4$Cl (g) | NaCl (g) | BaCl$_2$ (g) | MgCl$_2$ (g) | SrCl$_2$ (g) | CaCl$_2$ (g) | CaCl$_2$·2H$_2$O (g) |
|---|---|---|---|---|---|---|---|---|---|---|
| 6 | 1862.2 | 44.7 | 0 | 18.6 | 74.5 | 0 | 0 | 0 | 0 | 0 |
| 7 | 1516.3 | 59.1 | 30.3 | 15.2 | 318.4 | 60.7 | 0 | 0 | 0 | 0 |
| 8 | 1516.3 | 59.1 | 30.3 | 15.2 | 318.4 | 0 | 60.7 | 0 | 0 | 0 |
| 9 | 1527.4 | 59.6 | 30.5 | 15.3 | 320.7 | 0 | 0 | 46.5 | 0 | 0 |
| 10 | 1538.1 | 60.0 | 30.8 | 15.4 | 323.0 | 0 | 0 | 0 | 32.8 | 0 |
| 11 | 1537.5 | 58.1 | 30.8 | 15.4 | 307.5 | 0 | 0 | 0 | 50.7 | 0 |
| 12 | 1618.9 | 54.1 | 32.4 | 16.2 | 242.8 | 0 | 0 | 0 | 35.6 | 0 |
| 13 | 1709.3 | 49.7 | 34.2 | 17.1 | 170.9 | 0 | 0 | 0 | 18.8 | 0 |
| 14 | 1522.0 | 58.9 | 30.4 | 15.2 | 335.9 | 0 | 0 | 0 | 0 | 38.1 |
| 15 | 1567.0 | 56.6 | 31.3 | 15.7 | 313.4 | 0 | 0 | 0 | 0 | 15.7 |

Examples 6–15 were thoroughly blended in 2 liter plastic bottles using roll-mill and paint shaker techniques and then loaded into silica boats. Examples 6, 7, 11–13 were fired for 2.5 hours in a quartz muffle furnace at 1675° F. under an atmosphere of flowing nitrogen and carbon disulfide. Examples 8–10 were fired for 2.5 hours in a quartz muffle furnace at 1675° F. under the same atmosphere. Examples 14 and 15 were fired for 2 hours in a quartz muffle furnace at 1720° F. under the same atmosphere of flowing nitrogen and carbon disulfide.

After firing, the boats or crucibles were slowly cooled to room temperature. The fired cakes were then washed with hot de-ionized water and sodium thiosulfate until the conductivity of the wash was less than 50 $\mu$S/cm. A dilute HCl acid washing was required to remove MgO flakes from the phosphor particle surfaces in Example 8 which was made using the mixed NaCl-MgCl$_2$ flux. The washed materials were dewatered, dried and sieved −325 mesh. The base phosphors were analyzed as described above. A 3-minute sonication was used to obtain the D50$_s$ particle size. The relative brightness was determined with respect to a standard finished commercial ZnS:Ag CRT phosphor (Type 1331 manufactured by OSRAM SYLVANIA, Towanda, Pa.). The results are presented in Table 8.

TABLE 8

| Example No. | 6 | 7 | 8 | 9 | 10 | 11 | 12 | 13 | 14 | 15 |
|---|---|---|---|---|---|---|---|---|---|---|
| 1% Ag mix | 2.4% | 3.9% | 3.9% | 3.9% | 3.9% | 3.8% | 3.2% | 2.9% | 3.87% | 3.61% |
| 1% Al mix | 0 | 2.0% | 2.0% | 2.0% | 2.0% | 2.0% | 2.0% | 2.0% | 2.0% | 2.0% |
| NaCl | 4.0% | 21% | 21% | 21% | 21% | 20% | 15% | 10% | 22.07% | 20.0% |
| $BaCl_2$ | 0 | 4.0% | 0 | 0 | 0 | 0 | 0 | 0 | 0 | 0 |
| $MgCl_2$ | 0 | 0 | 4.0% | 0 | 0 | 0 | 0 | 0 | 0 | 0 |
| $SrCl_2$ | 0 | 0 | 0 | 3.04% | 0 | 0 | 0 | 0 | 0 | 0 |
| $CaCl_2$ | 0 | 0 | 0 | 0 | 2.13% | 3.3% | 2.2% | 1.1% | 0 | 0 |
| $CaCl_2.2H_2O$ | 0 | 0 | 0 | 0 | 0 | 0 | 0 | 0 | 2.5% | 1.0% |
| $D50_{ns}$ | 14.51 | 10.33 | 13.50 | 10.57 | 10.63 | 10.21 | 11.18 | 12.52 | 10.59 | 11.01 |
| $D50_s$ | 11.04 | 9.96 | 10.65 | 9.68 | 9.34 | 9.74 | 10.16 | 10.47 | 9.58 | 10.22 |
| $\%\Delta_{D50}$ | 24% | 3.6% | 21% | 8.4% | 12% | 4.6% | 9.1% | 16% | 9.5% | 7.2% |
| Relative Brightness | 118% | 111% | 106% | 106% | 107% | 107% | 109% | 113% | 105% | 116% |
| Y coordinate | 0.053 | 0.054 | 0.056 | 0.053 | 0.054 | 0.055 | 0.055 | 0.055 | 0.056 | 0.057 |

Figure 4:
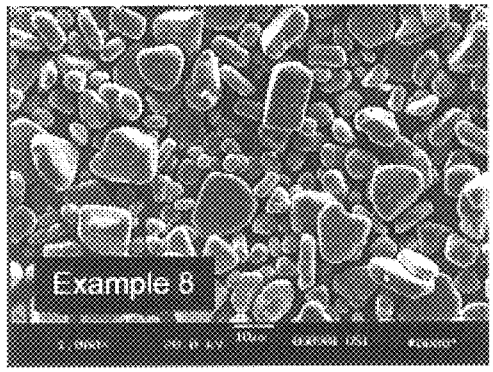
FIG. 4 is a an SEM photomicrograph of a ZnS:Ag,Al phosphor made with a mixed NaCl-MgCl$_2$ flux.
Figure 5:
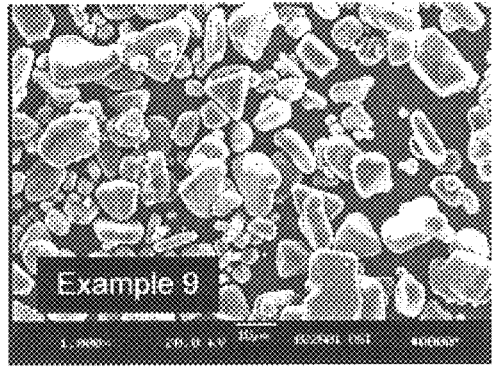
FIG. 5 is a an SEM photomicrograph of a ZnS:Ag,Al phosphor made with a mixed NaCl-SrCl$_2$ flux.
Figure 6:
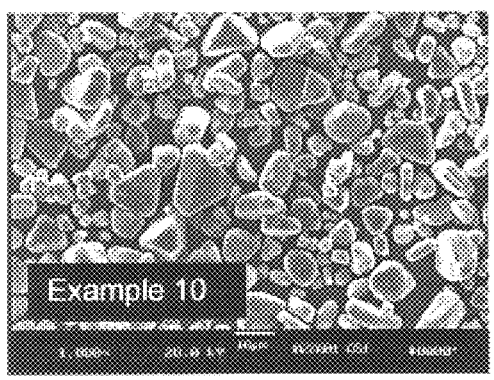
FIG. 6 is a an SEM photomicrograph of a ZnS:Ag,Al phosphor made with a mixed NaCl-CaCl$_2$ flux.
Figure 7:
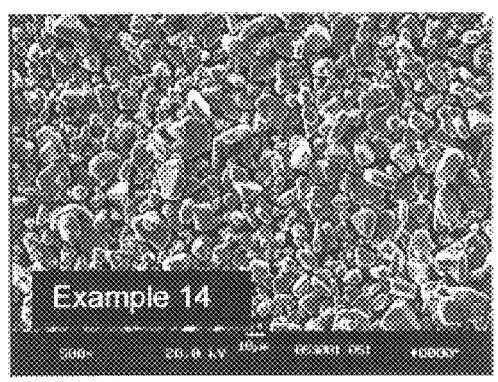
FIG. 7 is a an SEM photomicrograph of a ZnS:Ag,Al phosphor made with a mixed NaCl-CaCl$_2$.2H$_2$O flux.

FIGS. 4, 5, 6 and 7 are SEM photomicrographs of the ZnS:Aq,Al phosphors prepared in Examples 8, 9, 10 and 14, respectively. FIGS. 4, 5, and 6 are at 1000×magnification. FIG. 14 is at 500×magnification. The results for Examples 7–15 demonstrate that the use of the aluminum addition in combination with a wide range of mixed sodium chloride and alkaline-earth metal chloride fluxes lead to the preparation of phosphors with excellent physical properties, including a substantially polyhedral morphology, low agglomeration, few fine particles, and advantageous particle size distributions.

While there has been shown and described what are at the present considered the preferred embodiments of the invention, it will be obvious to those skilled in the art that various changes and modifications may be made therein without departing from the scope of the invention as defined by the appended claims.

We claim:

1. A blue-emitting ZnS:Ag,Al phosphor powder comprising ZnS:Ag,Al phosphor particles having a substantially polyhedral morphology and a $\%\ \Delta_{D50}$ of less than about 20%, the phosphor emitting visible light having a Y color coordinate of from about 0.048 to about 0.056 when stimulated by cathode rays.

2. The phosphor powder of claim 1 wherein $\%\ \Delta_{D50}$ is less than about 10%.

3. The phosphor powder of claim 1 wherein the powder has a mean particle size of from about 7 μm to about 11 μm.

4. The phosphor powder of claim 1 wherein the powder has mean particle size of from about 8.5 μm to about 9.5 μm.

5. A method of making a ZnS:Ag,Al phosphor comprising:
   combining an amount of a zinc sulfide source, an amount of a silver source, an amount of an aluminum source, an amount of a mixed flux, and optionally, an amount of an ammonium chloride source, the mixed flux comprising a mixture of sodium chloride and an alkaline-earth metal chloride selected from barium chloride, calcium chloride, magnesium chloride, strontium chloride, and their hydrated salts;
   firing the combined sources and mixed flux in a sulfur-containing atmosphere for a time and a temperature sufficient to form the ZnS:Ag,Al phosphor; and
   washing the phosphor to remove residual flux and unreacted silver, the ZnS:Ag,Al phosphor containing from about 100 ppm to about 300 ppm of silver and from about 50 ppm to about 200 ppm of aluminum.

6. The method of claim 5 wherein the alkaline-earth metal chloride is added in an amount from 1% to 10% by weight of the zinc sulfide source and the sodium chloride is added in an amount from 1% to 30% by weight of the zinc sulfide source.

7. The method of claim 5 wherein the alkaline-earth metal chloride is added in an amount from 2% to 6% by weight of the zinc sulfide source and the sodium chloride is added in an amount from 15% to 25% by weight of the zinc sulfide source.

8. The method of claim 5 wherein the zinc sulfide source is a chlorinated zinc sulfide and the amount of ammonium chloride is from 0 to 2% by weight of the chlorinated zinc sulfide.

9. The method of claim 8 wherein the alkaline-earth metal chloride is added in an amount from 1% to 10% by weight of the chlorinated zinc sulfide and the sodium chloride is added in an amount from 1% to 30% by weight of the chlorinated zinc sulfide.

10. The method of claim 8 wherein the alkaline-earth metal chloride is added in an amount from 2% to 6% by weight of the chlorinated zinc sulfide source and the sodium chloride is added in an amount from 15% to 25% by weight of the chlorinated zinc sulfide source.

11. The method of claim 9 wherein the ZnS:Ag,Al phosphor contains from about 180 ppm to about 220 ppm of silver and from about 100 ppm to about 180 ppm of aluminum.

12. The method of claim 5 wherein the combined source and mixed flux are fired at a temperature from about 1675° F. to about 1720° F. for about 1 hour to about 2.5 hours.

13. The method of claim 5 wherein the phosphor is washed with a thiourea solution.

14. A method of making a ZnS:Ag,Al phosphor comprising:
   combining an amount of a zinc sulfide source, an amount of a silver source, an amount of an aluminum source, an amount of a mixed flux, and optionally, an amount of an ammonium chloride source, the mixed flux comprising a mixture of sodium chloride and an alkaline-earth metal chloride selected from barium chloride, calcium chloride and their hydrated salts;
   firing the combined sources and mixed flux in a sulfur-containing atmosphere for a time and a temperature sufficient to form the ZnS:Ag,Al phosphor; and
   washing the phosphor to remove residual flux and unreacted silver.

15. The method of claim 14 wherein the alkaline-earth metal chloride is added in an amount from 1% to 10% by weight of the zinc sulfide source and the sodium chloride is added in an amount from 1% to 30% by weight of the zinc sulfide source.

16. The method of claim 14 wherein the alkaline-earth metal chloride is added in an amount from 2% to 6% by weight of the zinc sulfide source and the sodium chloride is added in an amount from 15% to 25% by weight of the zinc sulfide source.

17. The method of claim 14 wherein the zinc sulfide source is a chlorinated zinc sulfide and the amount of ammonium chloride is from 0 to 2% by weight of the chlorinated zinc sulfide.

18. The method of claim 17 wherein the alkaline-earth metal chloride is added in an amount from 1% to 10% by weight of the chlorinated zinc sulfide and the sodium chloride is added in an amount from 1% to 30% by weight of the chlorinated zinc sulfide.

19. The method of claim 17 wherein the alkaline-earth metal chloride is added in an amount from 2% to 6% by weight of the chlorinated zinc sulfide source and the sodium chloride is added in an amount from 15% to 25% by weight of the chlorinated zinc sulfide source.

20. The method of claim 18 wherein the alkaline-earth metal chloride is barium chloride.

21. The method of claim 18 wherein the alkaline-earth metal chloride is calcium chloride.

22. The method of claim 18 wherein the alkaline-earth metal chloride is $CaCl_2 \cdot 2H_2O$.

23. The method of claim 18 wherein the ZnS:Ag,Al phosphor contains from about 100 ppm to about 300 ppm of silver and from about 50 ppm to about 200 ppm of aluminum.

24. The method of claim 18 wherein the ZnS:Ag,Al phosphor contains from about 180 ppm to about 220 ppm of silver and from about 100 ppm to about 180 ppm of aluminum.

25. The method of claim 14 wherein the combined source and mixed flux are fired at a temperature from about 1675° F. to about 1720° F. for about 1 hour to about 2.5 hours.

26. The method of claim 20 wherein the phosphor is washed with a thiourea solution.

27. A blue-emitting ZnS:Ag,Al phosphor powder comprising ZnS:Ag,Al phosphor particles having a substantially polyhedral morphology and a % $\Delta_{D50}$ of less than about 20%, the ZnS:Ag,Al phosphor particles containing from about 100 ppm to about 300 ppm of silver and from about 50 ppm to about 200 ppm of aluminum.

28. The phosphor powder of claim 27 wherein % $\Delta_{D50}$ is less than about 10%.

29. The phosphor powder of claim 27 wherein the powder has a mean particle size of from about 7 $\mu$m to about 11 $\mu$m.

30. The phosphor powder of claim 27 wherein the powder has mean particle size of from about 8.5 $\mu$m to about 9.5 $\mu$m.

31. The phosphor powder of claim 27 wherein the ZnS:Ag,Al phosphor particles contain from about 180 ppm to about 220 ppm of silver and from about 100 ppm to about 180 ppm of aluminum.

* * * * *